United States Patent [19]
Packer

[11] Patent Number: 6,029,569
[45] Date of Patent: Feb. 29, 2000

[54] APPARATUS FOR FOOD CONTAMINANT REMOVAL

[76] Inventor: Scott Packer, 324 W. 1570 North, Pleasant Grove, Utah 84062

[21] Appl. No.: 09/325,029

[22] Filed: Jun. 3, 1999

Related U.S. Application Data

[62] Division of application No. 08/903,515, Jul. 30, 1997, Pat. No. 5,914,145.

[51] Int. Cl.[7] .............................. B04B 3/00; B04B 5/00; A23L 1/025
[52] U.S. Cl. .............................. 99/537; 99/567; 494/31; 494/34; 494/36; 494/43; 494/44; 494/51; 494/52; 494/60; 210/360.1; 210/360.2; 210/361; 210/364; 210/359; 210/365; 210/380.1; 210/499; 426/478; 426/479; 426/481; 426/490; 426/491; 426/495
[58] Field of Search .............................. 99/495, 501, 502, 99/503, 504, 537, 567; 494/31, 34, 36, 43, 44, 51, 52, 60, 76, 77; 210/360.1, 360.2, 361, 363, 364, 359, 365, 380.1, 499; 426/478, 479, 481, 482, 484, 485, 489, 490, 491, 495

[56] References Cited

U.S. PATENT DOCUMENTS

| | | | |
|---|---|---|---|
| 650,402 | 5/1900 | Laplace | 210/380.1 |
| 1,343,078 | 6/1920 | Carter | 210/380.1 X |
| 3,475,178 | 10/1969 | Zebarth et al. | 426/478 X |
| 4,715,956 | 12/1987 | Heckmann et al. | 210/363 |
| 5,300,013 | 4/1994 | Frassdorf et al. | 494/34 |
| 5,401,407 | 3/1995 | Jones et al. | 210/360.1 X |

*Primary Examiner*—Milton Cano
*Attorney, Agent, or Firm*—Morriss, Bateman O'Bryant & Compagni

[57] ABSTRACT

An improved method and apparatus for the removal of solid contaminants which utilizes at least one rotating mesh screen container designed to pass the food therethrough while trapping the solid contaminant. The rotation of the cylindrically-shaped mesh screen causes the food to pass through because of the centrifugal force. The addition of a second mesh or membrane-like placed around the first screen but rotated in the opposite direction is also utilized to trap solid contaminants which are large enough to be trapped by the mesh screen when it is not oriented so as to pass through the screens along its length. Different spacings in mesh and different rotation velocities are utilized to change contaminant screen characteristics.

17 Claims, 5 Drawing Sheets

APPARATUS FOR FOOD CONTAMINANT REMOVAL

This application is a divisional of application Ser. No. 08/903,515 filed Jul. 30, 1997, now U.S. Pat. No. 5,914,145.

BACKGROUND

1. The Field of the Invention

This invention relates generally to separation of materials. More specifically, foreign materials (contaminants) are removed from food products, where the food products can be processed by screening through a mesh or membrane-like material used in combination with a centrifuge system.

2. The State of the Art

It is desirable to eat food products which are free of contaminants. This is particularly true in this day of increasing awareness of the hazards which contaminated food products pose to consumers. Accordingly, food processing companies are under increasing pressure to provide food to the consumer that is always safe for consumption. This pressure on the food processor remains high despite significant government regulations already in place which require minimum health standards. Nevertheless, public awareness and concern has created a need for continued development of contaminant detection and elimination technologies. It should also be realized that even when contaminants do not pose a health hazard to the consumer, awareness of their existence in food products can adversely affect the fortunes of a company if a food quality problem is even perceived by the consumer.

A significant portion of food contaminants can be removed during processing. The processing referred to can be any stage of food preparation (where the term "food" is hereinafter used to refer to the terms food and food products) such as the bringing together of raw materials to be combined to make a processed food product.

Food contaminant removal can be as simple as the washing of food before it is either packaged in a raw form or used as an ingredient of another processed food. However, washing is obviously a wet cleaning process which can not be used on all foods.

The food contaminant removal processes of greatest relevance to the present invention pertain to those which are accomplished in food processing lines. For example, the prior art teaches X-ray detection systems for locating solid contaminants. However, these systems are costly and prone to error because of their reliance on human intervention and concentration.

A different type of system is magnetic detection, where magnetic contaminants can be thereby removed. A screen or mesh has also been employed in contaminant separation. However, screens have been primarily used in cleaning liquids. The effectiveness of screens with solids is compromised by the substantial force often required to keep the solids flowing through the screen. Still another system relies on an electrostatic property of the contaminant. For example, by bringing a charged surface near to the contaminant, those contaminants which are attracted to the charged surface can be separated from the food.

Consequently, it would be an improvement over the state of the art to provide a more reliable and automatic method and apparatus for removing solid contaminants from both solid and liquid food. It would be a further improvement if the solid contaminants could be removed regardless of their magnetic or electrostatic properties.

OBJECTS AND SUMMARY OF THE INVENTION

It is an object of the present invention to provide a method and apparatus for solid contaminant removal from solid food.

It is another object to provide a method and apparatus for solid contaminant removal from liquids.

It is a further object to provide the method and apparatus for solid contaminant removal where the solid contaminant can be a non-ferrous material.

It is a further object to provide the method and apparatus for solid contaminant removal utilizing a combination of a mesh or membrane-like material in combination with a centrifuge.

It is a further object to provide the method and apparatus for solid contaminant removal which includes a plurality of containers in the form of cylinders of different diameters so as to fit a smaller container in a next larger container until the plurality of containers are disposed within the largest container, and constructed from mesh or membrane-like material, and which are rotated in opposite directions relative to adjacent containers to thereby provide more effective solid contaminant removal.

The present invention is realized in a method and apparatus for the removal of solid contaminants which utilizes at least one rotating mesh screen designed to pass the food therethrough while trapping the solid contaminant. The rotation of the cylindrically-shaped mesh screen causes the food to pass through because of the centrifugal force.

In another aspect of the present invention, a second mesh or membrane-like screen is placed around (but spaced apart from) the first screen, but rotated in the opposite direction to trap solid contaminants which are large enough to be trapped by the mesh when it is not oriented so as to pass through the screens along its length. Alternatively, the containers can be rotated in a same direction but at different rotational speeds.

In another aspect of the present invention, the method and apparatus for successful operation is made a function of mesh size and speed of rotation the mesh screen or screens, but not a function of food particle size.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
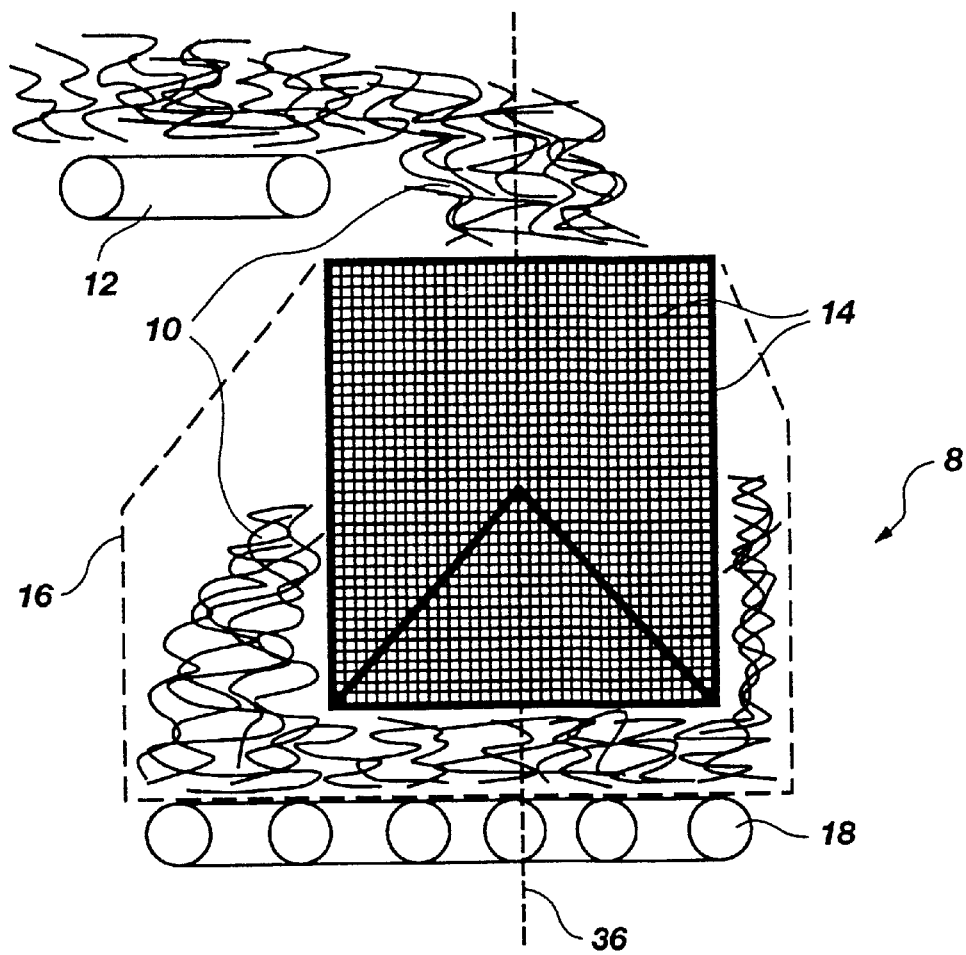
FIG. 1 is a profile view of a food processing line which includes the presently preferred embodiment constructed in accordance with the principles of the present invention, where a mesh screen container in the form of a cylinder is rotated to cause the food to leave the container while leaving behind solid contaminants.

FIG. 1 is a profile view of a food processing line 8 which includes the presently preferred embodiment of the present invention. In this limited profile view, it is assumed that a food 10 is presently being conveyed from a preceding process to the cleaning process of the present invention. Generally, food flows between food processing stations on conveyers or through pipes (not shown).

In the presently preferred embodiment shown in FIG. 1, a first mesh screen container 14 (in the form of a cylinder) is shown having an open top such that the food 10 can flow down into the container from a first conveyer 12. The first mesh screen container 14 is also disposed within a housing 16 so as to contain the food 10 which is thrown by the centrifugal force through the mesh. It should also be realized that any suitable entry port into the container can be used. The top of the container does not have to provide access to the inside of the container.

Regarding the mesh used in the first mesh screen container 14, the spacing or mesh size will be selected according to the food which will be screened. For example, a liquid will have a mesh size of 220 or less (where mesh size ratings are known to those skilled in the art) to prevent large solid contaminants from passing through the first mesh screen container 14. A mesh size of 120 to 220 will be effective in screening flour. Finally, a mesh size greater than 80 would be used for food such as rice and beans.

It should be mentioned that even a porous membrane can be used in the present invention as a screen. In this way, a high volume water purification system is possible. Accordingly, mesh size can extend down into the submicron region, while the largest could be several inches for bulkier solid food.

In the presently preferred embodiment, a last component of the processing line 8 is a second conveyer 18 beneath the housing 16 for transporting away screened food 10.

Figure 2:
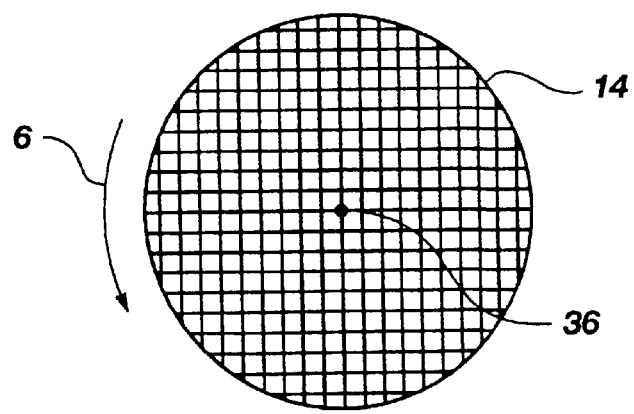
FIG. 2 is top view of the mesh screen container as described in FIG. 1, where an arrow describes a direction of rotation of the mesh screen container.

The first mesh screen container 14 is disposed within the housing 16 so as to rotate around a central axis 36. This axis 36 is also shown as a point in FIG. 2 where an arrow 6 shows a selected direction of rotation of the first mesh screen container 14. Being balanced for rotation can assure smoother operation and less stress on materials. However, the volume of food particles can get very large, and the stresses on the mesh can be significant. Accordingly, the first mesh screen container 14 is preferably formed of a heavy gauge stainless steel screen mesh. This mesh is placed on the perimeter of the first mesh screen container 14, as well as the bottom.

Figure 3:
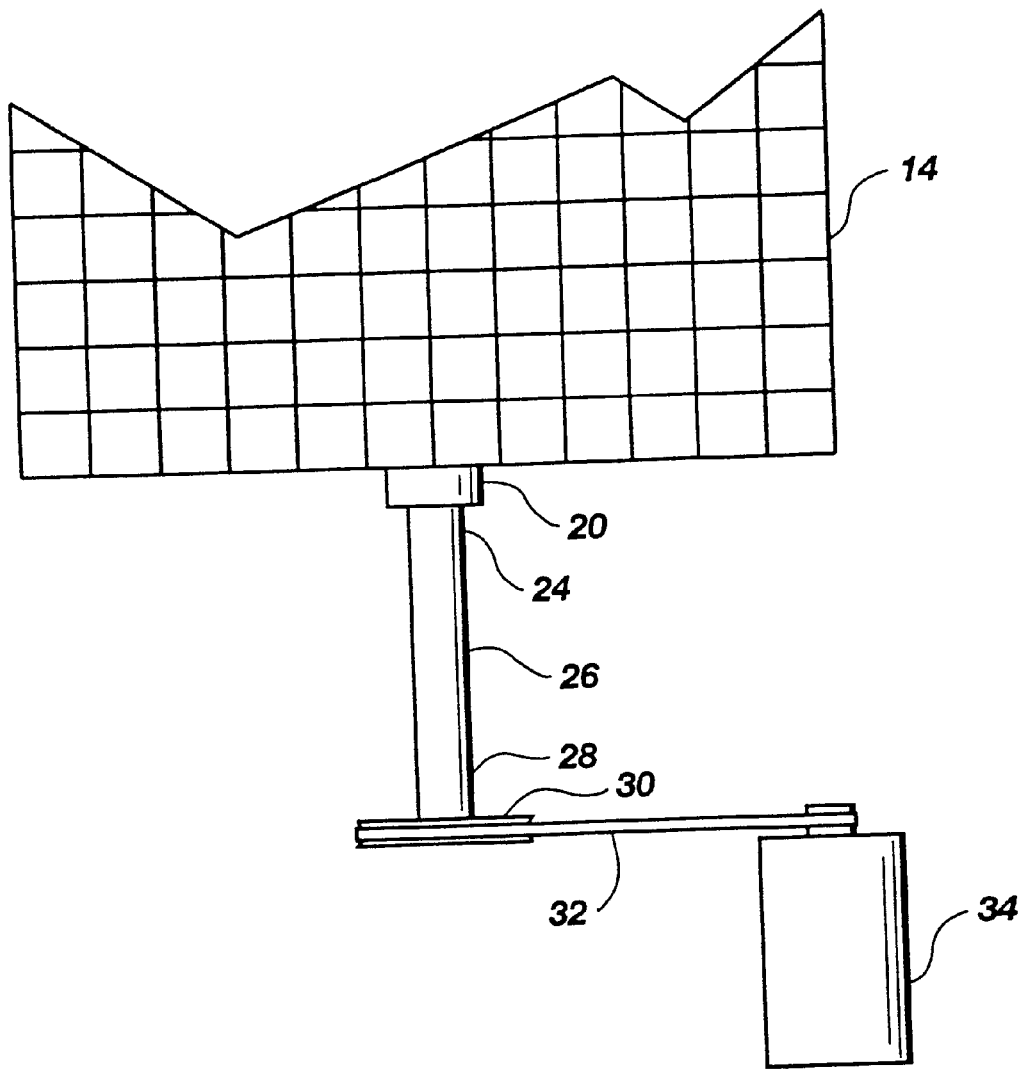
FIG. 3 is a detailed profile schematic view showing one example of how the first mesh screen container 14 can be rotated using a simple connection to a motor in the presently preferred embodiment of FIG. 1.

In the presently preferred embodiment, there are other components required to cause the spinning of the first mesh screen container 14. For example, as shown in FIG. 3, a fitting 20 is either bolted or welded to a point 22 located at the center of the bottom mesh. A first end 24 of a shaft 26 is coupled to the fitting 20 to thereby enable torque to be applied for rotation of the first mesh screen container 14. A second end 28 of the shaft 26 is coupled to a pulley 30. The pulley 30 is driven by a belt 32 which is also coupled to a variable speed motor 34.

Operation of the present invention as described above is relatively straightforward. The food 10 enters the top of the first mesh screen container 14 carried by a conveyer 12 or tube (not shown). The first mesh screen container 14 is rotated by the variable speed motor 34. The centrifugal force generated by the rotation of the first mesh screen container 14 is selected to be sufficient such that the food 10 is forced through the mesh screen, while contaminants that are larger than the mesh remain.

The direction of rotation of the first mesh screen container 14 is irrelevant in this preferred embodiment. However, the speed of rotation has a great affect upon effectiveness of the present invention. If rotation is too fast, solid contaminants such as hair can be broken and the smaller pieces consequently forced through the mesh. However, the speed of rotation must also be fast enough to force the food 10 through the mesh. It is envisioned that experimentation is required to find optimum rotational speeds for the first mesh screen container 14 so that a balance is achieved between proper food flow through the screens, and contaminant removal. Various factors will be discussed laster which determine an optimum speed.

Figure 4:
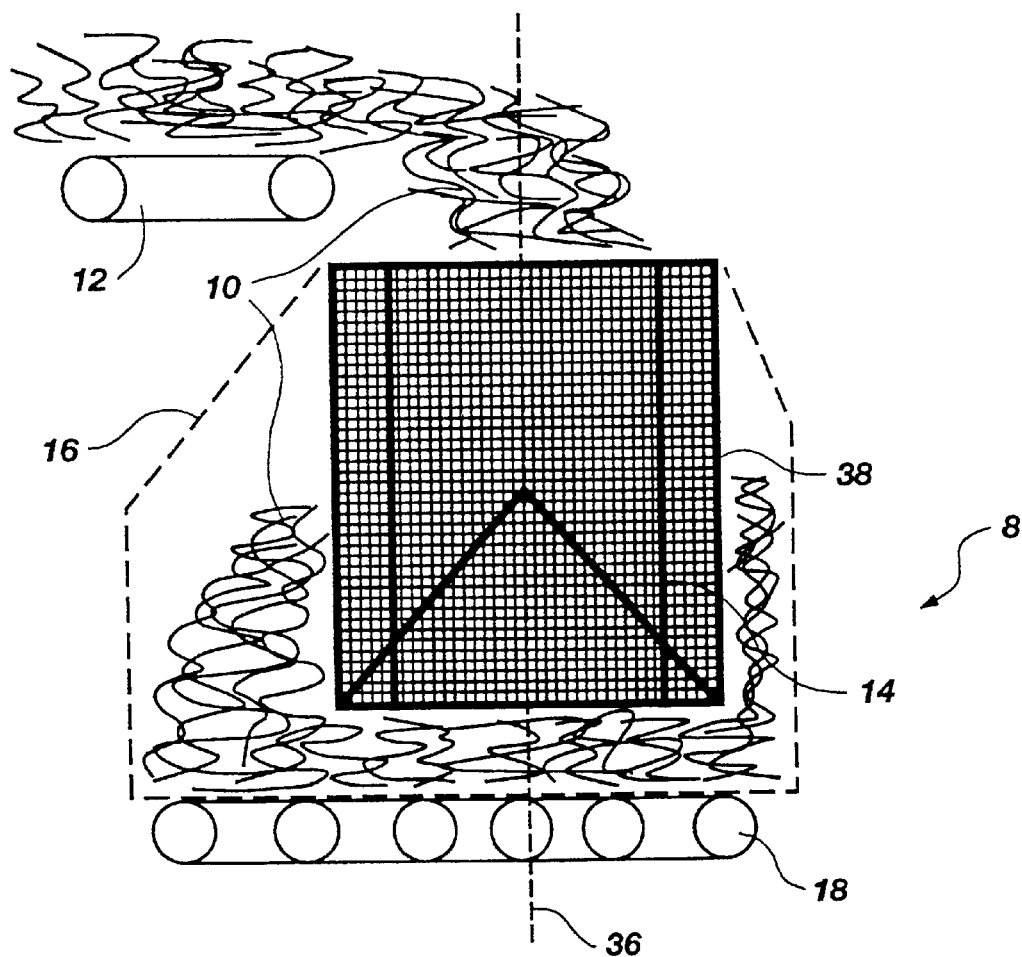
FIG. 4 shows in a profile view of an alternative embodiment of the present invention the addition of a second mesh screen container in which the first mesh screen container is disposed so that food placed in the first mesh container must pass through it and the second mesh container in order to continue a path through the food processing line.

FIG. 4 shows in a profile view that an important alternative embodiment to the presently preferred embodiment described above is the addition of a second mesh screen container 38. While FIG. 4 shows that the top of the first mesh screen container 14 is generally flush with the top of the second mesh screen container 38, it can be lower.

Figure 5:
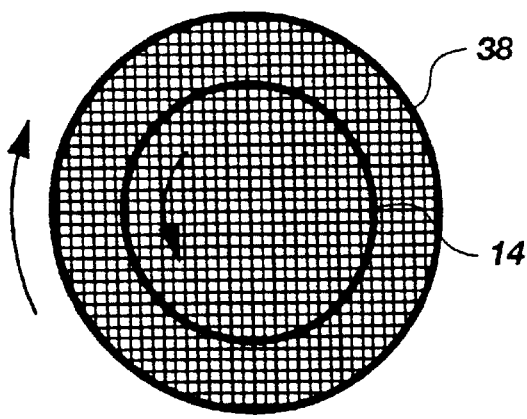
FIG. 5 is a top view of the containers of FIG. 4. The figure illustrates the concept that the directions of rotation of the containers are opposite to thereby achieve the greatest advantages of the alternative embodiment.

FIG. 5 is a top view of the containers 14 and 38 of FIG. 4. The figure illustrates the concept that the directions of rotation of the containers 14 and 38 is opposite to thereby achieve the advantages thereof. However, it should be realized that similar results can be achieved when the containers are rotated in a same direction, but at different speeds.

Figure 6:
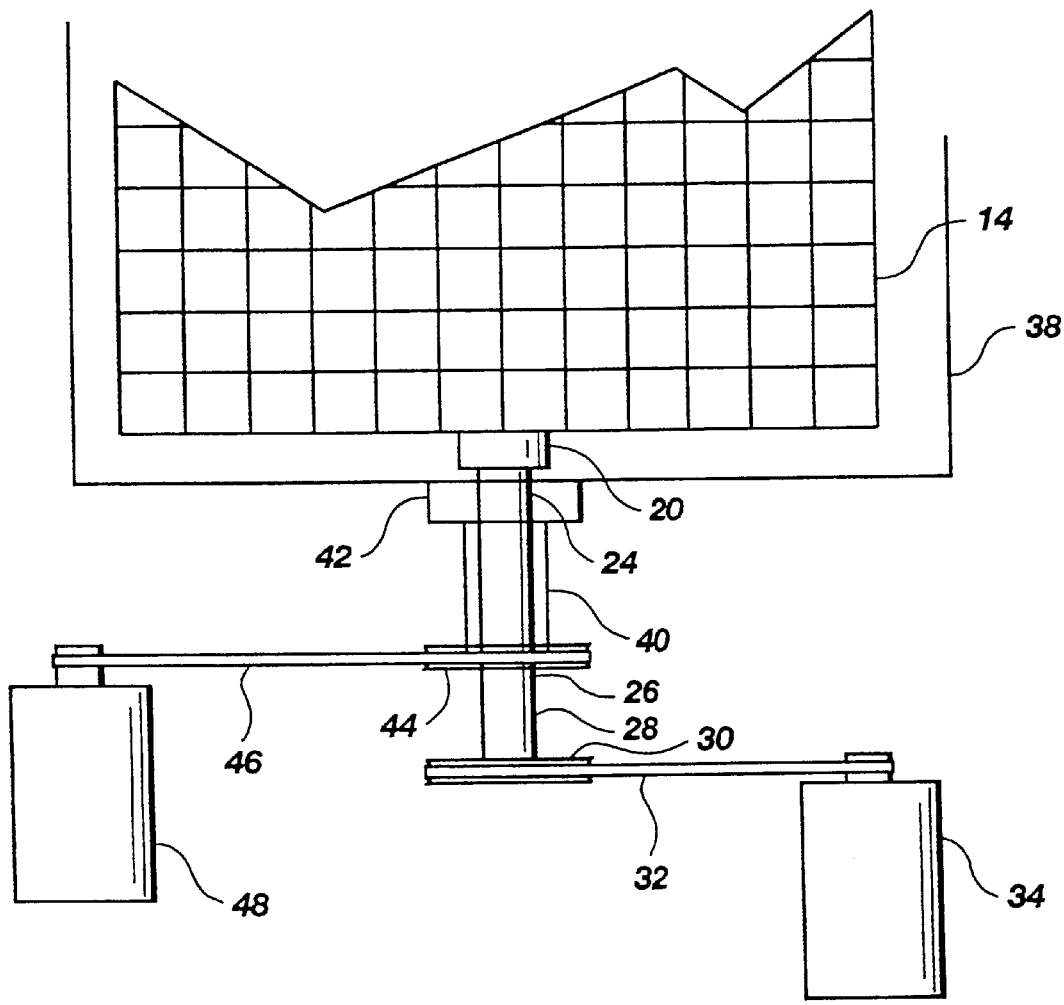
FIG. 6 is a more detailed cross section schematic of an example of implementation of the alternative embodiment which allows for independent rotation of the two containers.

In another aspect, FIG. 6 is a more detailed cross section schematic of an example of implementation of the alternative embodiment which allows for independent rotation of the two containers. Specifically, it begins by showing that the second mesh screen container 38 is added to the system by placing a tube 40 around the shaft 26, where the end of the tube 40 is coupled to a different fitting 42 which is centered on the bottom of the second mesh screen container 38. A pulley 44 is coupled to the tube 40, and a belt 46 couples the pulley 44 to a second variable speed motor 48.

The shafts and tubes are assembled to have appropriate bearing and support members such that the first mesh screen container 14 and the second mesh screen container 38 may rotate at various speeds. Food entering the first mesh screen container 14 will exit out the bottom and sides of the second mesh screen container 38.

A critical aspect of the alternative embodiment is that the first mesh screen container 14 is rotated in a direction opposite to the direction of rotation of the second mesh container 38. Typically, those food contaminants which are able to slip through the first mesh screen container 14 do so because of a chance alignment. For example, a piece of hair pokes one end through the mesh and the food pushes it along. However, when the hair meets the second mesh screen container 38 which is rotating in an opposite direction, it is much less likely to get through following this original orientation. Consequently, a double screen system is likely to have almost no food contaminants get through the mesh if they are any larger than the food itself.

Another aspect of the invention is that the speed of rotation of either cylinder can be changed in order to achieve an optimum force required to maintain a continuous flow of food through the containers 14 and 38.

Another aspect of the invention is that the containers do not have to be cylinders for the present invention to advantageously function as described.

Another aspect of the invention is that when more than one container is being used, the containers do not have to rotate in opposite directions. However, the rotational speed of the containers is then varied to achieve similar results.

It is important to realize that the optimum speed of rotation will vary greatly depending upon the mesh size. Along with mesh size being a factor, optimum speed will also vary as a function of the diameter of the container. This is because a small number of revolutions per minute (RPM) can translate into a high surface speed if the container is large. Therefore, an RPM value of even 10,000 might be too small and an RPM value of 20 can be too large depending upon mesh size, diameter of the container, and size of the food. It is envisioned that for particular applications and mesh sizes, RPM values can easily range between 1 and 15,000.

Along with speed of rotation and container diameter, the spacing between an inner container and an outer container can also be adjusted to affect performance by providing containers of varying sizes as determined through experimentation. The spacing also has a significant effect on what food contaminants are able to pass through the inner container, but fail to pass through the outer container. For example, where a contaminant such as hair might flow through the inner container because of an unfortunate initial orientation, it will be moving in a direction parallel to the outer container, and will thus be caught if allowed to settle on the outer container without interference from the inner container.

The food contaminant of hair is of particular concern to the present invention. Accordingly, the present invention has often referred to hair in examples above because it has been designed to be particularly effective at its capture and subsequent removal from food. However, the present invention will likely be very effective at capturing a large variety of other food contaminants.

Figure 7:
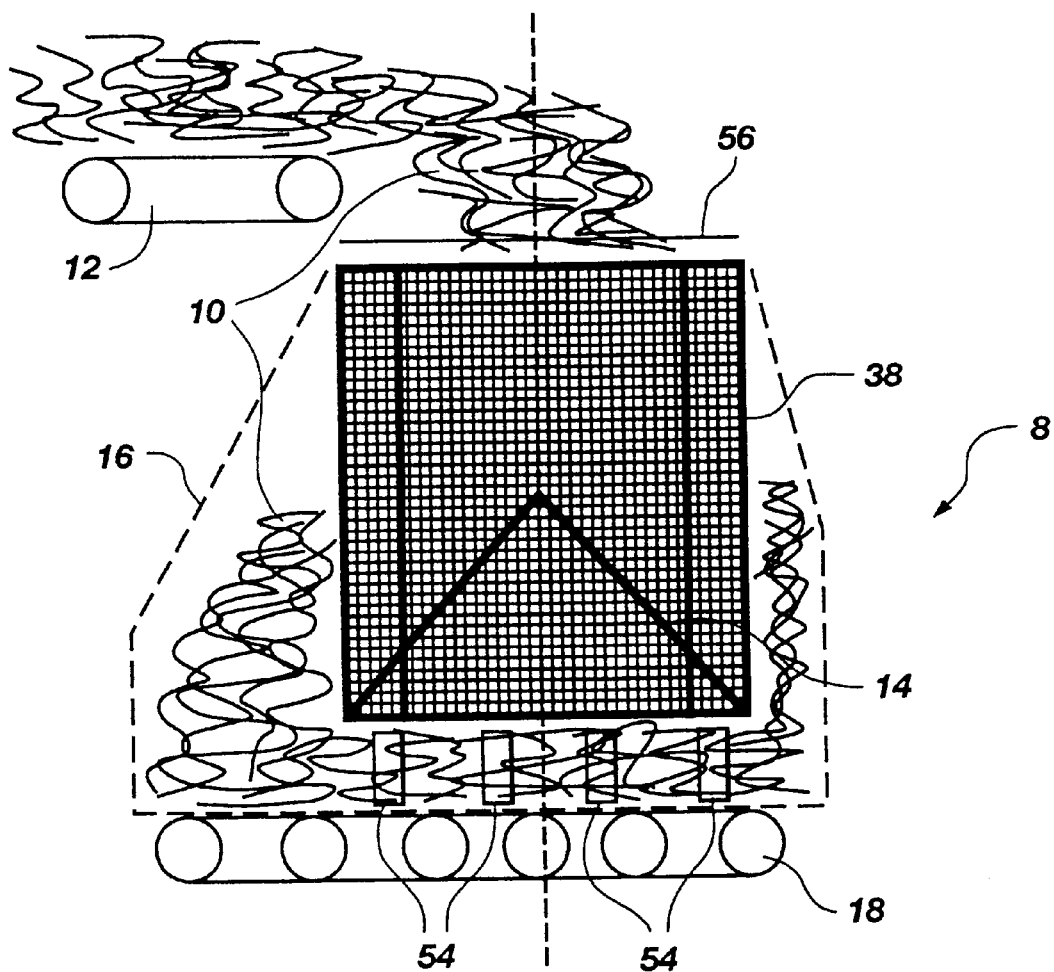
FIG. 7 is a profile view of another alternative embodiment of the present invention where two mesh screen containers have a forced gas delivered at the bottom of the containers and a statically charged surface placed above for catching and removing solid food contaminants which can be electrostatically attracted.

FIG. 7 shows that along this line of thinking, hair is one particular food contaminant which is affected by electrostatic charge. Therefore, another alternative embodiment of the present invention is the combination of an electrostatic charge removal system in combination with the mesh screen and centrifuge of the present invention.

One example of a combined system is the addition of a forced gas or positive pressure gas circulation devices 54 which direct gas flow upward from beneath the containers 14 and 38. A substantial portion of food as well as contaminants are then thrown upward toward an electrostatic sheet or element 56. While the food particles generally continue movement outward through the containers 14 and 38, contaminants such as hair will be caught by the electrostatic element 56 and the containers 14 and 38.

Alternatively, a static charge might also be applied directly to the containers 14 and 38 without the need for the positive pressure gas circulation devices 54. The process is still substantially improved.

It is also important to realize that the containers of the preferred and the alternative embodiments require periodic cleaning. Advantageously, removal of containers to sterilize or otherwise clean them is not difficult. For example, the containers are detached from the shafts at the fittings. Alternatively, the fittings could also be left in the housing when the containers are removed for cleaning.

In an alternative embodiment of the present invention, the cylinders used as the containers in the previous embodiments can be replaced by other shapes. For example, a cauldron-type shape can also be employed. What is important is that when a plurality of containers are being utilized, that the smaller containers be able to fit inside the larger containers, and yet have sufficient space between them so that there is no contact of mesh surfaces. It is also important that because of typical speeds of rotation of the containers, it is probably necessary that the containers be of a shape which will not have a substantial wobble. Generally, the container should be balanced about its own central axis.

The preferred and alternative embodiments above are addressed specifically to the concerns of contaminant removal from food. However, it should be realized that the present invention advantageously provides the ability to removal contaminants from other materials. Accordingly, the principles of the present invention are also generally application to materials separation through the use of oppositely spinning mesh containers.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A system for removing contaminants from food to thereby improve quality of the food as a finished product or as an ingredient in a processed food, said system comprising:

a first container formed of a mesh screen for catching a portion of the contaminants while allowing passage of the food therethrough, wherein the first container has an entry port therethrough for the introduction of contaminated food, and wherein the first container is disposed so as to rotate about a central axis;

a means for rotating the first container;

a second container formed of a mesh screen for catching a portion of the contaminants while allowing passage of the food therethrough, wherein the second container is disposed so as to rotate in a direction opposite to the first container about the central axis, wherein the first container is disposed co-axially inside the second container, and wherein the diameter of the second container is greater than that of the first container;

means for rotating the second container;

a housing in which the first container and the second container are disposed, and which provides a barrier to catch the food which passes through the mesh screen of the first container and the second container when the containers are rotated;

a first conveyance means for transporting the food and the contaminants mixed therein to an open top of the first container where the food enters into the first container when the first conveyance means is in operation; and a second conveyance means for transporting the food from the housing, and which is collected within the housing after rotation of the first container and the second container.

2. The system as defined in claim 1 wherein the system further comprises a means for removing the first container from within the housing, to thereby enable removal of the contaminants which have collected therein after rotation of the first container which has had food delivered thereto via the first conveyance means.

3. The system as defined in claim 1 wherein the first container further comprises an upright cylinder, and wherein a side of the upright cylinder is parallel to the central axis.

4. The system as defined in claim 3 wherein the entry port in the upright cylinder further comprises an open top of the upright cylinder, with the mesh screen forming a side and a bottom thereof.

5. The system as defined in claim 4 wherein the system further comprises an electrostatic element disposed within the first container for attracting thereto materials which are attractable to an electrostatic charge.

6. The system as defined in claim 5 wherein the system further comprises a forced gas delivery means for directing at least one stream of forced gas into the first container to thereby force at least a portion of the food and the contaminants within the first container to pass sufficiently close to the electrostatic element so that a portion of the contaminants which can be attracted to an electrostatic charge are captured by the electrostatic element.

7. The system as defined in claim 6 wherein the electrostatic element further comprises an electrostatic sheet which covers at least a portion of the open top of the first container.

8. The system as defined in claim 4 wherein the system further comprises:

a fitting mounted under the bottom of the first container;

a shaft having a first end coupled to the fitting to thereby provides a means for applying a rotational torque to the first container;

a pulley coupled to a second end of the shaft;

a motor for applying the rotational torque to the first container; and a belt disposed about the pulley and the variable speed motor.

9. The system as defined in claim 1 wherein the system further comprises:

a first rotational torque means for applying torque to the first container in a first rotational direction; and a second rotational torque means for applying torque to the second container in a second rotational direction which is opposite to that of the first rotational direction.

10. The system as defined in claim 1 wherein the system further comprises:

a first rotational torque means for applying torque to the first container in a first rotational direction and at a first rotational speed; and a second rotational torque means for applying torque to the second container in a same direction as the first second rotational direction and at a second rotational speed which is different from the first rotational speed.

11. The system as defined in claim 1 wherein the first rotational torque means further comprises a variable speed motor.

12. The system as defined in claim 1 wherein the second rotational torque means further comprises a variable speed motor.

13. The system as defined in claim 1 wherein the system further comprises:

a second fitting mounted under the bottom of the second canister;

a tube having a first end coupled to the second fitting to thereby provides a means for applying a rotational torque to the second container;

a pulley coupled to a second end of the tube;

a variable speed motor for applying the rotational torque to the second container; and a belt disposed about the pulley and the variable speed motor.

14. The system as defined in claim 1 wherein the system further comprises a plurality of containers which can be substituted for the first container or the second container, and wherein the plurality of containers differ therefrom in mesh size and diameter.

15. A system for removing contaminants from food to thereby improve food purity, said system comprising:

a first container formed as an upright cylinder having an open top, a side and a bottom formed of a mesh screen for catching a portion of the contaminants, wherein the first container is disposed so as to rotate about a central axis parallel to the side of the upright cylinder;

a second container formed as an upright cylinder having an open top, a side and a bottom formed of a mesh screen for catching a portion of the contaminants, wherein the second container is disposed so as to rotate about the central axis, wherein the first container is disposed co-axially inside the second container, and wherein the diameter of the second container is greater than that of the first container.

a means for rotating the first container;

a means for rotating the second container independent of a speed and direction of rotation of the first container;

a housing in which the first container and the second container are disposed, and which provides a barrier to catch the food which passes through the mesh screen of the first container and the second container when the containers are rotated;

a first conveyance means for transporting the food and the contaminants mixed therein to the open top of the first container where the food enters into the first container when the first conveyance means is in operation; and a second conveyance means for transporting the food from the housing, and which is collected within the housing after rotation of the first container and the second container.

16. A system for separating materials of different sizes, said system comprising:

a first container having an open top, and all other sides formed of a mesh screen of a selected size, wherein the first container is disposed so as to rotate about a central axis;

a second container having an open top, and all sides formed of a mesh screen of the selected size, wherein the second container is disposed so as to rotate about the central axis, wherein the first container is disposed co-axially inside the second container, and wherein dimensions of the second container are greater than that of the first container such that the first container does not touch the mesh screen of the second container;

a means for rotating the first container in a first direction;

a means for rotating the second container in a direction which is counter to that of the first direction; and a means for delivering the materials of different sizes to the first container.

17. A system for removing contaminants from food to thereby improve food purity, said system comprising:

a plurality of containers, each formed as an upright cylinder with a diameter different than each of the other containers, having an open top, a side and a bottom formed of a mesh screen for catching a portion of the contaminants, wherein each of the plurality of containers is disposed co-axially within a next largest container until all of the plurality of containers are disposed within a largest container, wherein each of the plurality of containers is free to rotate independent of a speed or direction of rotation of each of the other, and wherein each of the plurality of containers is disposed so as to rotate about a common central axis;

a means for independently rotating each of the plurality of containers in any desired direction and rotational speed;

a housing in which the plurality of containers are disposed, and which provides a barrier to catch the food which passes through the mesh screen of each of the plurality of containers when they are rotated;

a first conveyance means for transporting the food and the contaminants mixed therein to the open top of a smallest container whereby the food enters into the smallest container when the first conveyance means is in operation; and a second conveyance means for transporting the food from the housing, and which is collected within the housing after rotation of each of the plurality of containers.

* * * * *